United States Patent
Spitz

(10) Patent No.: US 6,325,288 B1
(45) Date of Patent: Dec. 4, 2001

(54) SELF-CONTAINED SCANNING AND VERIFYING APPARATUS WITH MOVABLY MOUNTED SCANNING UNIT

(75) Inventor: Glenn Steven Spitz, Northport, NY (US)

(73) Assignee: Webscan, Inc., Brentwood, NY (US)

( * ) Notice: Subject to any disclaimer, the term of this patent is extended or adjusted under 35 U.S.C. 154(b) by 0 days.

(21) Appl. No.: 09/370,690

(22) Filed: Aug. 9, 1999

(51) Int. Cl.[7] ........................................ G06K 7/10
(52) U.S. Cl. .................. 235/462.12; 235/462.01; 235/462.36; 235/462.41; 235/462.42; 235/462.43; 235/462.48; 358/474
(58) Field of Search ............. 235/462.01, 462.12, 235/462.36, 462.41, 462.42, 462.43, 462.48; 358/474, 401, 280

(56) References Cited

U.S. PATENT DOCUMENTS

| | | | |
|---|---|---|---|
| 4,251,798 | 2/1981 | Swartz et al. | 340/146 |
| 4,403,851 * | 9/1983 | Yanagawa | 355/14 R |
| 4,538,185 * | 8/1985 | Wiggins | 358/285 |
| 4,656,525 * | 4/1987 | Norris | 358/280 |
| 4,806,968 * | 2/1989 | Watanabe et al. | 355/15 |
| 4,831,458 * | 5/1989 | Watanabe | 358/280 |
| 4,849,793 * | 7/1989 | Someya | 355/75 |
| 4,893,196 * | 1/1990 | Koshiyouji et al. | 358/474 |
| 4,899,226 * | 2/1990 | Tanimoto et al. | 358/451 |
| 4,910,607 * | 3/1990 | Kita et al. | 358/400 |
| 4,980,781 * | 12/1990 | Yamamoto et al. | 358/474 |
| 4,987,445 * | 1/1991 | Burgess et al. | 355/84 |
| 4,989,099 * | 1/1991 | Koshiyouji et al. | 358/474 |
| 4,990,956 * | 2/1991 | Iwata | 355/218 |
| 5,038,227 * | 8/1991 | Koshiyouji et al. | 358/471 |
| 5,060,923 * | 10/1991 | Takimoto et al. | 271/198 |
| 5,138,454 * | 8/1992 | Parulski | 358/180 |
| 5,146,272 * | 9/1992 | Watanabe | 355/208 |
| 5,218,190 | 6/1993 | Hardesty et al. | 235/462 |
| 5,231,293 | 7/1993 | Longacre, Jr. | 250/568 |
| 5,260,553 | 11/1993 | Rockstein et al. | 235/462 |
| 5,285,056 | 2/1994 | Tedesco | 235/472 |
| 5,475,505 * | 12/1995 | Minasian et al. | 358/474 |
| 5,574,274 * | 11/1996 | Rubley et al. | 358/474 |
| 5,589,678 | 12/1996 | Atsumi et al. | 235/472 |
| 5,608,537 * | 3/1997 | Manabe et al. | 358/401 |
| 5,621,203 | 4/1997 | Swartz et al. | 235/462 |
| 5,729,001 | 3/1998 | Spitz | 235/462 |
| 6,104,497 * | 8/2000 | Cohen et al. | 358/401 |

OTHER PUBLICATIONS

Internet Downloaded Brochure, SE-2000 Scan Engine, Symbol Technologies, Aug. 5, 1999.

Internet Downloaded Brochure, LS-6804 / SE-900 Scan Engine, Symbol Technologies, Aug. 5, 1999.

* cited by examiner

Primary Examiner—Michael G. Lee
Assistant Examiner—U Chau Le
(74) Attorney, Agent, or Firm—Island Patent

(57) ABSTRACT

A print quality verifying apparatus, and methods of operation, for producing a plurality of substantially parallel and preferably equally spaced scans taken along a height of a data carrying graphical symbol, such as a bar code indicia. Each spaced scan taken causing an associated scan reflectance profile signal to be generated and collected. The apparatus including a movably mounted linear laser scanner unit. The movably mounted scanner unit may be positioned in any one of a plurality of scanning positions in a manual, or alternately an automated and controlled manner, to enable the plurality of spaced scans to be taken, with each spaced scan producing a scan reflectance profile signal. An apparatus of the invention may include signal conditioning and data processing elements for digitizing, collecting and processing each scan reflectance profile signal that is generated to enable the print quality of a scanned graphical symbol to be determined and evaluated to industry standards.

8 Claims, 8 Drawing Sheets

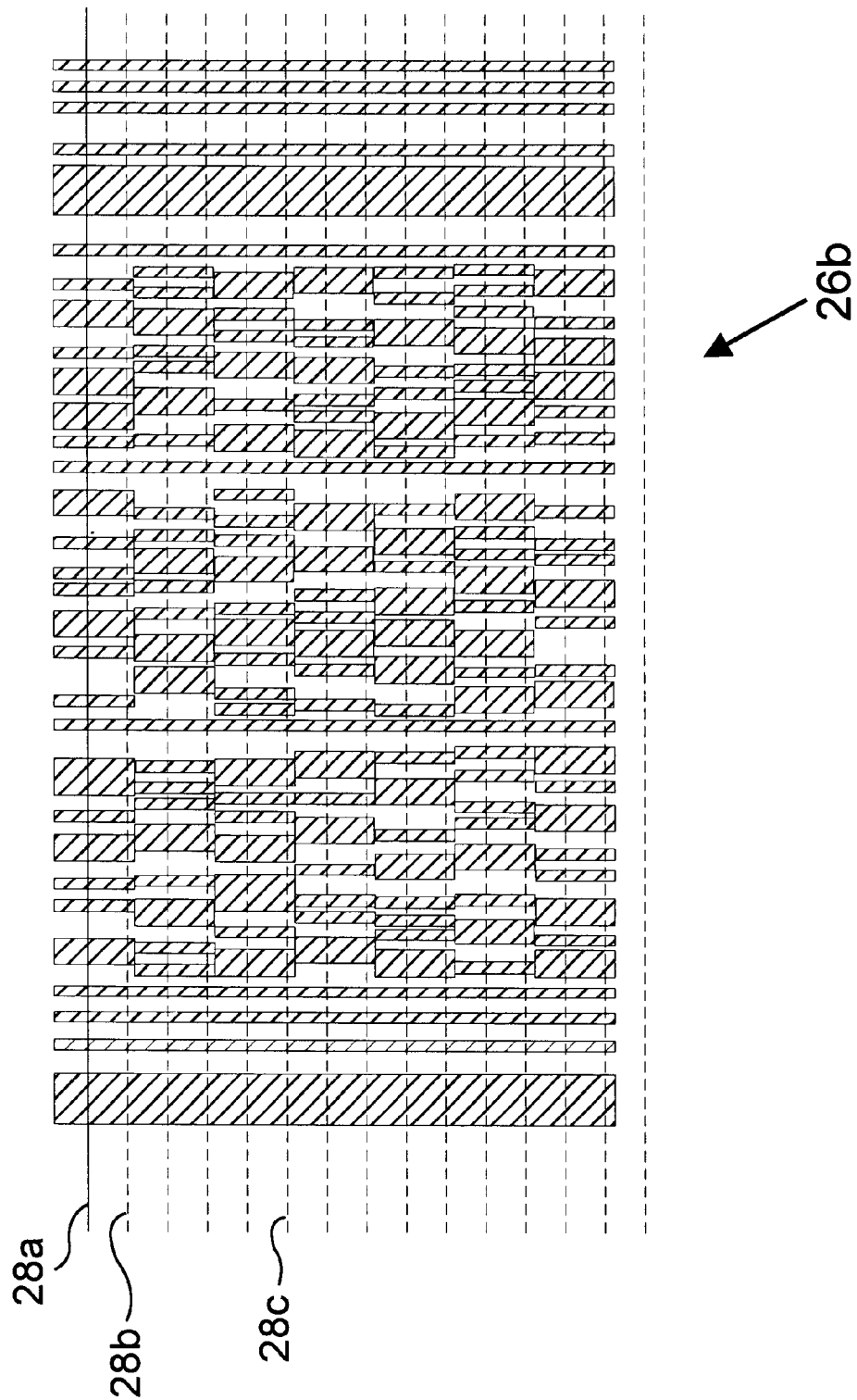

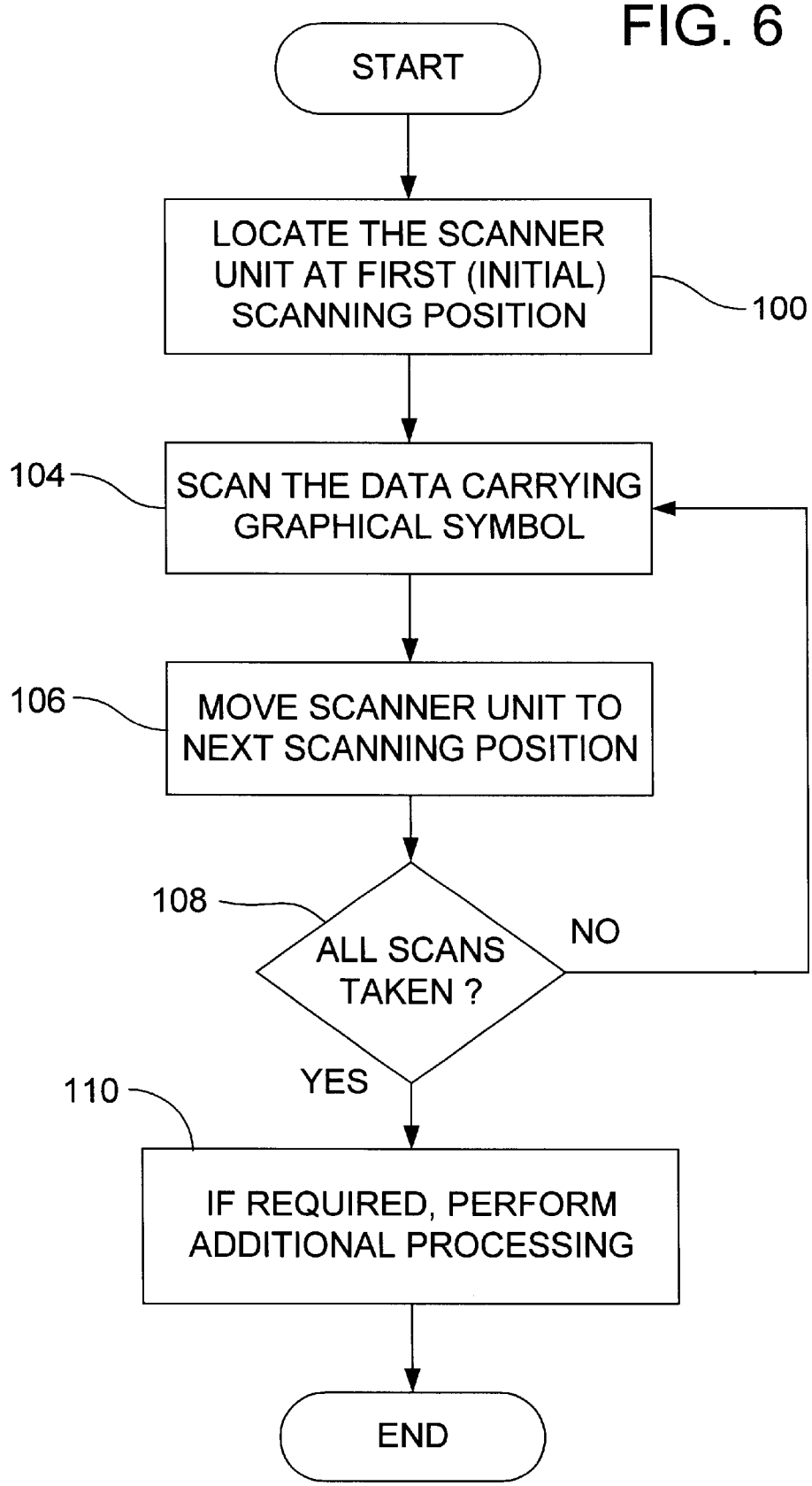

SELF-CONTAINED SCANNING AND VERIFYING APPARATUS WITH MOVABLY MOUNTED SCANNING UNIT

CROSS REFERENCE TO RELATED APPLICATIONS

The subject matter provided herein is related to that of U.S. Pat. No. 5,729,001, which issued on Mar. 17, 1998, and is hereby incorporated by reference.

BACKGROUND OF THE INVENTION

1. Field of the Invention

The present invention relates generally to evaluation and verifier systems. More particularly, the invention relates to methods and apparatus to enable the face of a data carrying graphical symbol, such as a 1D or 2D bar code, to be scanned in a controlled and desired manner to generate a plurality of preferably equi-spaced scans that are taken along at least a portion of the respective height of the face of the graphical symbol.

2. Description of the Prior Art

The scanning of bar code indicia with devices such as laser scanners, hand-held wands, and the like, results in a single scan being taken. Each scan taken may be assumed to generate a scan reflectance profile (SRP) signal, which is associated with the scanned location or region of the indicia. Often the SRP signal is digitized, generally in real-time (as the SRP signal is generated), to produce a sequence of digital samples that may be stored in a suitable memory structure. Most typically, all the samples produced are stored in an available memory and are later analyzed to determine the quality of the scanned indicia. Alternately, as taught by U.S. Pat. No. 5,633,488 to Spitz, the samples may be pre-processed to 'filter' and essentially store only samples that are required to quantitatively evaluate the scanned indicia.

At present, a number of industry standards or guidelines exist that establish acceptable methods that may be employed to quantitatively evaluate the quality of bar code indicia. Two such guidelines, which are well known in the art, have been established by the American National Standards Institute (ANSI), and the Uniform Code Council (UCC). The ANSI guideline (ANSI X3.182-1990) is titled "Bar Code Print Quality Guideline". The UCC guideline is titled "Quality Specification for the UPC Printed Symbol" (September 1994). These guidelines are concerned with the scanning and quantitative evaluation of 1-dimensional bar code indicia. An important requirement that should be met to provide true 'ANSI level reporting' of the quality of an indicia is the generation of a plurality of spaced scans taken along the height of the indicia being evaluated (see FIG. 4). This succession of scans may be described as being 'taken at equally spaced locations within an interrogation window' along the height of the elements forming the bar code indicia.

The generation of a plurality of equi-spaced scans is relatively easy when the indicia (or equivalently a suitable 'graphical symbol') to be evaluated is disposed on a moving substrate that is moving past the scanner at a substantially constant rate. For example, if the respective indicia to be evaluated are being printed on a substrate that is passing through a printing device, a scanner may be mounted in a suitable location to scan the indicia as they exit or pass through the printing device. These types of evaluation systems are termed 'on-line' as they may be configured to scan each and every indicia printed, often in real-time. It may be noted that on-line, possibly real-time ANSI reporting evaluation systems are typically prohibitively expensive to many organizations that would like to provide verification as indicia are printed.

An alternate approach, which provides a reasonable level of verification, is to employ self-contained devices that include hand-held scanning devices. For example, there are known devices that employ hand-held laser scanners and wands. However, when considering the scanning of a single stationary indicia, the generation of the plurality of spaced scans, especially equally spaced somewhat rapidly taken scans, is difficult, if not impossible. An operator's skill and patience can be determining factors in the success and results of such an evaluation. Further, if it is desired to scan a complex data carrying indicia, such as a 2-dimensional or matrix-type bar code indicia, these simple prior art devices are inadequate for the task. When considering the need to scan such 2D bar code indicia, specialized scanning engines, which are commonly referred to as 'raster scanning engines', are known in the art. However, raster scanning devices are generally structured to provide accurate reading and decoding of the content or information contained in a 1D or 2D indicia. As such, they are not configured to maintain a constant or nearly constant distance between the scanned symbol and scanning device's source/receiver portion. For very accurate and consistent evaluation of graphical symbol along the height thereof, maintaining a constant distance, and possibly a constant angle, between the scanner unit and scanned symbol may be most desirable.

Therefore, there is a need to provide new and improved methods and means to scan a stationary data carrying graphical symbol to provide a plurality of preferably equi-spaced scans (each yielding an SRP signal) having one or more of the following capabilities, features, characteristics, and or advantages:

- a movably mounted scanner unit that may be positioned in any one of a plurality of scanning positions to cause scans of an indicia to be taken along at least a portion of the height of elements composing the scanned indicia;
- a drive unit employable to position the movable scanner unit in a desired/required position;
- maintain a constant scan distance between a face of a scanned data carrying graphical symbol and a scanning unit, as the scanning unit is moved in a controlled manner to enable the plurality of scans to be collected;
- a support structure such as a support bed, or equivalent means, to support a substrate having a data carrying graphical symbol disposed (e.g., printed) thereon;
- embodiments wherein the scanner unit is housed below the data carrying graphical symbol and scans upwardly onto elements thereof;
- embodiments wherein the scanner unit is positioned above the graphical symbol and scan down onto elements;
- may include at least one transparent (e.g., plastic or glass) plate and or an opaque plate to support or hold a substrate having disposed thereupon a graphical symbol to be scanned;
- simple construction to provide a cost effective scanning and evaluation arrangement; and
- economical construction, possibly employing a number of off-the-shelf components.

The above listed capabilities, characteristics, and or associated novel features of the present invention, as well as others, may become more clear from a careful review of the description and figures provided herein. Attention is called to the fact, however, that the drawings and descriptions are illustrative only. Variations are contemplated as being part of the invention, limited only by the scope of the appended claims.

SUMMARY OF THE INVENTION

In accordance with the present invention, a method and apparatus are provided enabling the scanning of a face of a data carrying graphical symbol at a plurality of preferably substantially equi-spaced scanning positions. The scanning positions are selected to enable a plurality of scan lines to be generated along a respective height of the graphical symbol. The scanning may include the digitizing and storage of a scan reflectance profile (SRP) signal produced with each scan taken. As such, the invention provides methods and apparatus supporting the scanning of a graphical symbol enabling the capturing of information that essentially provides a digitized (possibly very course) raster-type image of the graphical symbol. Alternately, if the scanning positions are selected to be tightly spaced, it is contemplated that a detailed digitized raster-type image may be stored via the present invention. The stored digitized image (e.g., stored sample values) may be immediately or subsequently analyzed to evaluate the quality of the scanned graphical symbol. However, it should also be noted that it may be desirable not to store a full set of data sample values for each digitized SRP signal generated. For example, it may be desirable to simply store some or all of the peak values occurring within the SRP signals. The apparatus includes a scanner unit, most preferably movably mounted. The movable mounting of the scanner unit enables the moving of the scanner unit between a first starting position and a second ending position, thereby enabling the scanning of a face of a data carrying graphical symbol at any one of a plurality of selectable scanning positions therebetween (i.e., between the first position and second positions). It is contemplated that a control module and drive unit may be further included and operatively coupled to the scanner unit. The drive unit is arranged to be responsive to the control module for moving the scanner unit in a controlled, possibly linearly incremental or stepped manner, to a selected (scanning) position. The selected position being inclusively between the first and second position and having associated therewith a respective scanning position.

A scanning apparatus of the present invention may be suitably structured to support the scanning of a substrate having the data carrying graphical symbol disposed thereupon while the movably mounted scanner unit is moved in the controlled manner. Accordingly, if a succession of equi-spaced parallel scans are taken, one at each selected or established scanning position, a plurality of scans may be taken along at least a portion of the height of the graphical symbol. A number of mechanical preferred arrangements, and associated methods of operation will be discussed hereinafter.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows:

FIG. 5 provides a plan view of a 2-dimensional bar code indicia scanned in a fashion similar to that of the indicia depicted in FIG. 4.

FIG. 6 is a flow chart of a method that may be employed to generate the scan lines illustrated in FIGS. 4 and 5.

Figure 1:
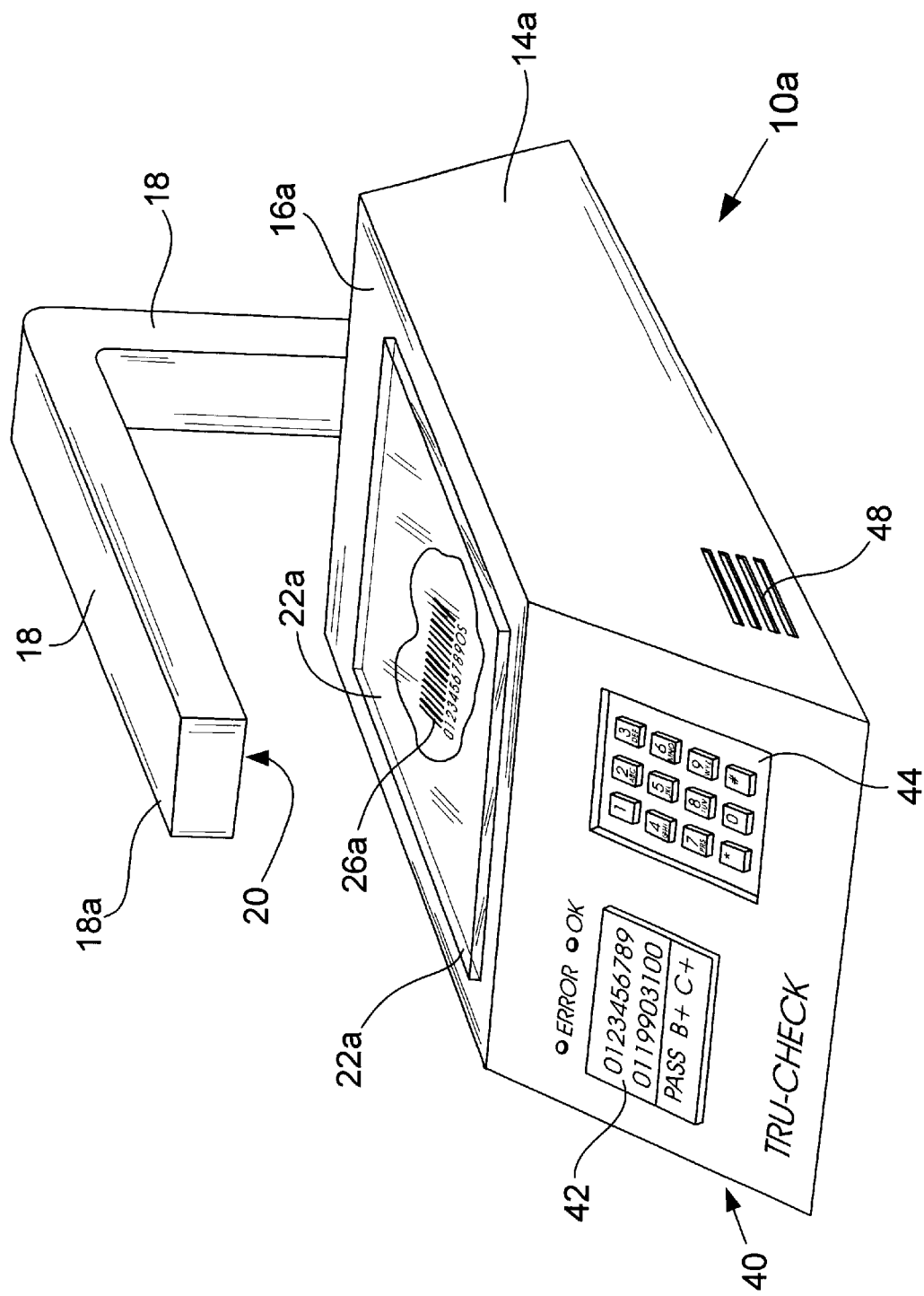
FIG. 1 depicts a perspective view of an embodiment of a scanning and verifier apparatus in accordance with the present invention.

PARTIAL LIST OF REFERENCE NUMERALS 10a, 10b—scanning and verifier apparatus
14a, 14b—chassis
16a, 16b—support bed
18—elevation arm
18a—end of elevation arm
20—scanner unit
22a, 22b—transparent plate
24—cover
26a, 26b—graphical symbols
28a, 28b—scan lines or scanning positions
30—support means
32—slide mount
38—base
40—user interface
42—display
44—switch means
46—audio module
48—audio sounder
50, 50a—drive unit
52, 52a—motor
54a—cam disk
54b, ,54c—drive member
56—base (p/o chassis or sub-chassis)
58—hinge means
60—control module
62—processor
64—memory unit
66—interface circuitry (module)
68—substrate

DETAILED DESCRIPTION OF THE INVENTION

Figure 3:
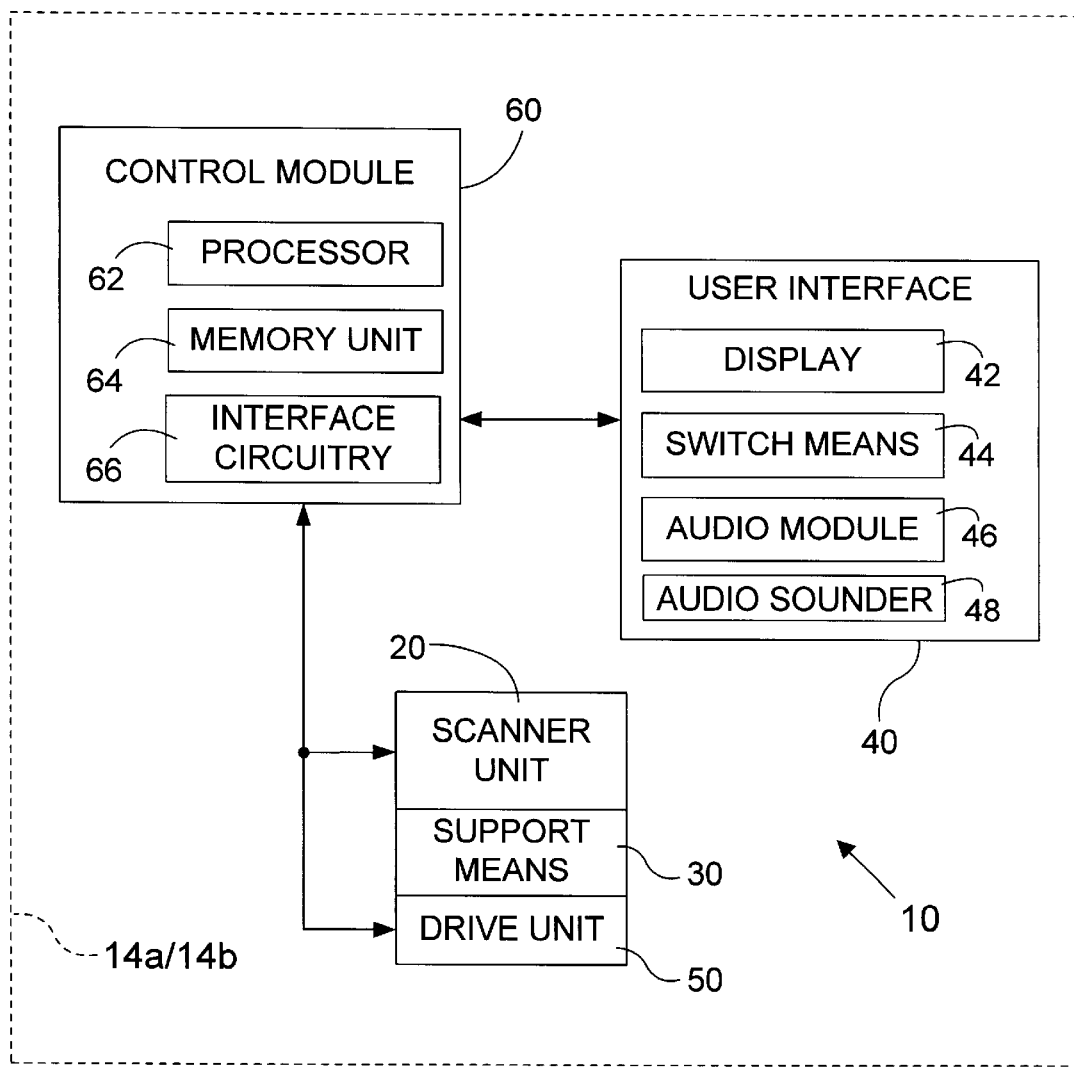
FIG. 3 illustrates a high level block diagram of the embodiments of FIGS. 1 and 2.
Figure 4:
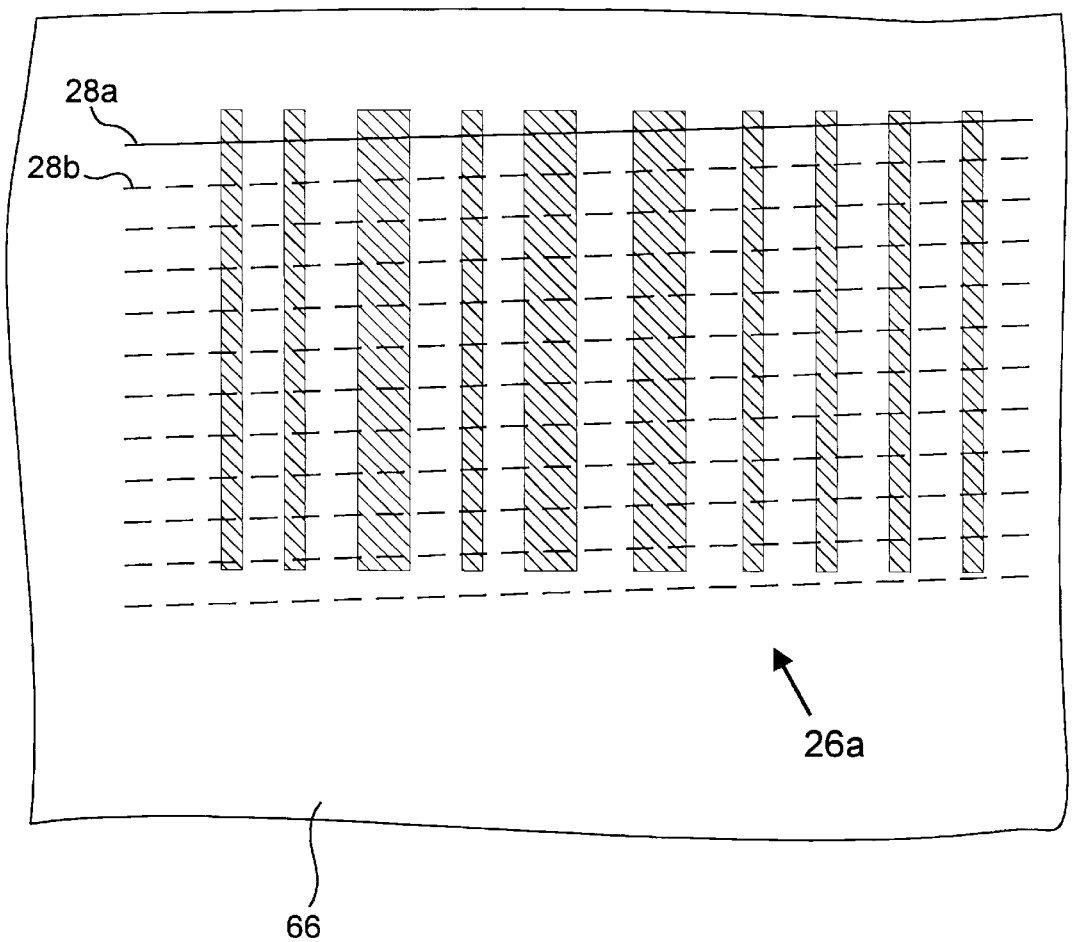
FIG. 4 provides a plan view of a 1-dimensional bar code indicia depicting a plurality of possibly equi-spaced scanning positions, having spatial integrity.

It is important to establish the definition of a number of terms and or expressions that will be used throughout this disclosure. The terms 'graphical symbol', 'data carrying graphical symbol', 'symbol', and 'indicia', as employed herein, may be assumed to include any type of symbol having a 2-dimensional face (area) encoding data within a visual or graphical symbol. For example, both 1-D and 2-D bar code indicia, including Code 39, UPC, MAXICODE, PDF417, and data matrix indicia, may be assumed to be examples of a graphical symbol in accordance with the present invention. The term 'movably mounted' is to be applied to mounting configurations of a scanner unit so that the scanner unit may be positioned in one of any of a plurality of positions between a first (starting) position and a second (ending) position to effect scanning, or generating a scan line, at a selected scanning position. As such, preferred mounting arrangements may be provided as slidable, pivotal, hinged, rack & pinioned, and other arrangements providable by skilled persons to meet the movable functional requirement of the invention. Also, the definition of the expression "along at least a portion of the height of the graphical symbol", as applied when discussing the scanning of a symbol or indicia in accordance with the invention, is to be defined as taking scans at a plurality of spaced scanning positions or scanning locations that may cover most of or only a portion of the height of a selected scanned symbol. For example, as can be seen in FIG. 4 of this disclosure, and FIGS. 1 and 3 of U.S. Pat. No. 5,729,001, which was incorporated by reference above, the term 'along at least a portion of the height of the graphical symbol' may be realized by two or more adjacent scans being taken and processed. This term and related aspects of the invention will discussed further below. Importantly, the term 'housing' is to be broadly defined as it is applied in the present disclosure. As such, a housing in accordance with embodiments of the invention may include any suitable structure, which may be provided by arrangements including a simple frame, an open chassis, a complex open or closed chassis, or other structures, that will support the components of the embodiments of the scanning arrangements, and or scanning and verifier apparatus of the present invention. As such, when considering the expression 'a suitable portable housing', the term may be assumed to indicate a housing of a size to enable the easy transport of a scanning and or scanning and verifier apparatus by an individual for use where needed. The term 'spatial integrity', as applied to a plurality of scan lines, may be assumed to indicate the scan lines are taken having a known relative position to each other, or equivalently a known relative position to a known starting or reference location. Accordingly, a plurality of scans taken having spatial integrity, will enable an image, possibly a course image, to be stored and or analyzed. Other important terms and definitions will be provided, as they are needed, to properly and concisely define the present invention and its associated novel characteristics and features.

Figure 2:
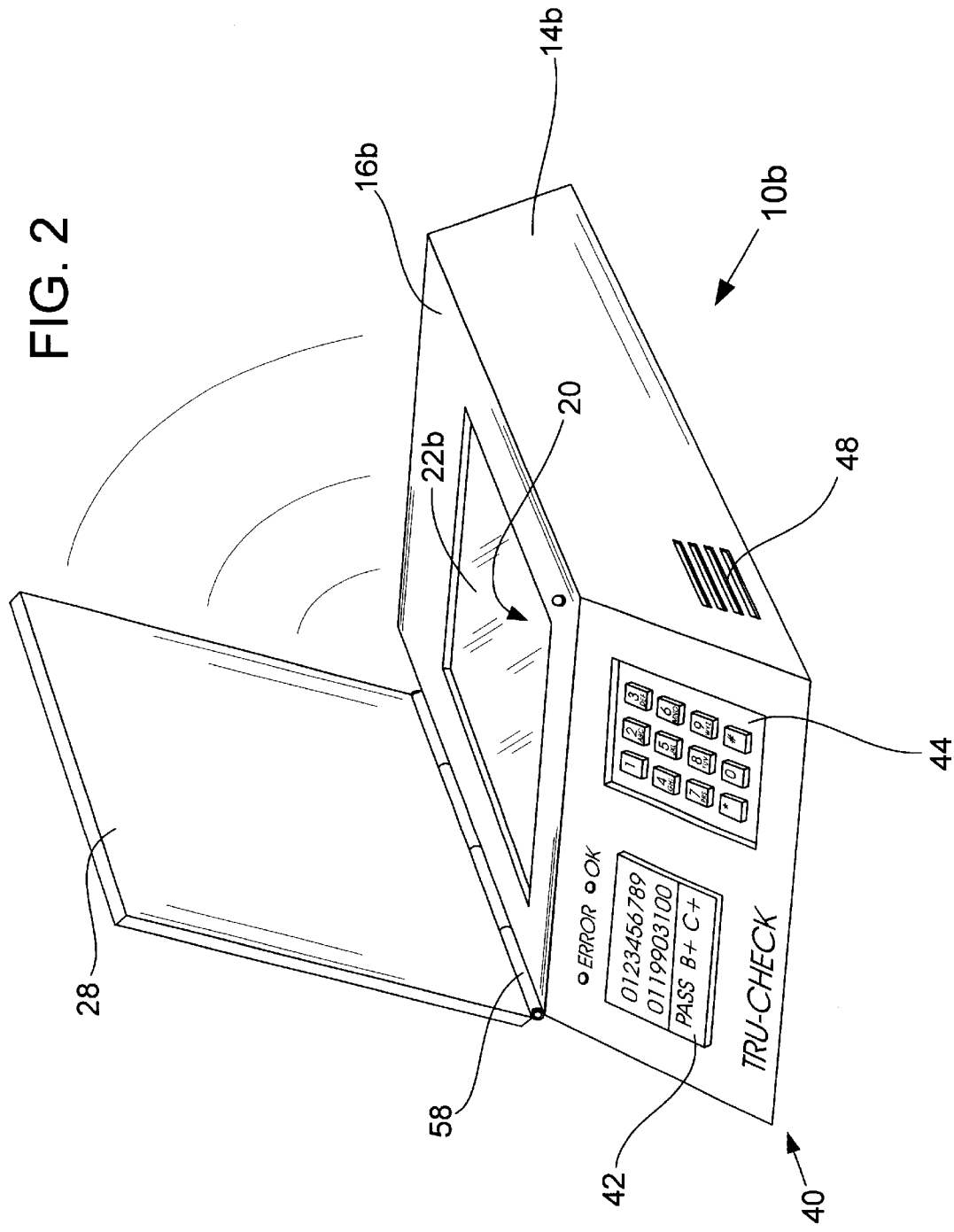
FIG. 2 depicts an alternate embodiment of the apparatus depicted in FIG. 1 in a perspective view.
Figure 7A:
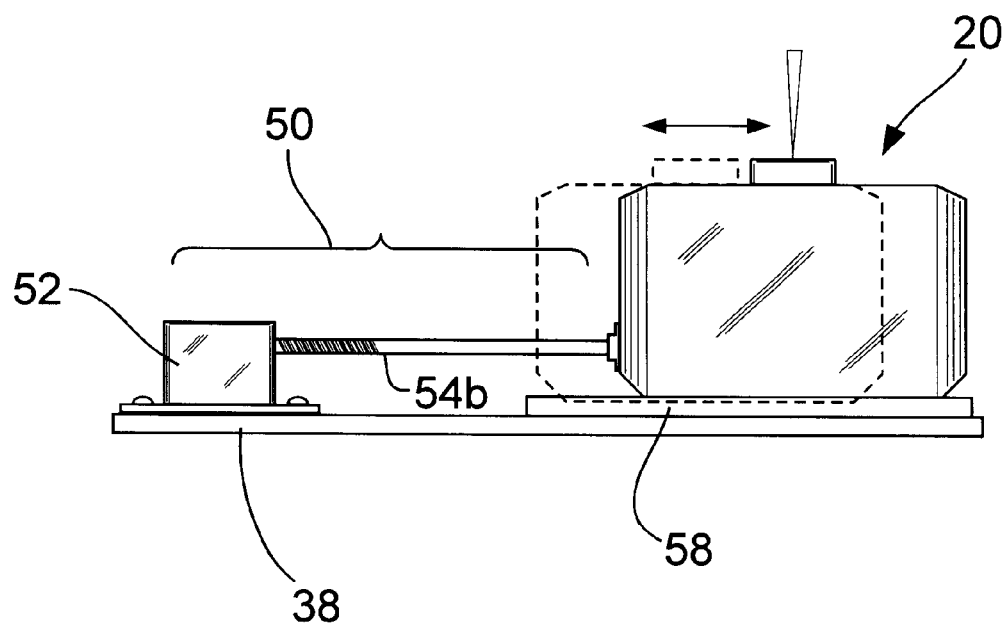
FIGS. 7A, 7B and 7C depict arrangements that may be employed to provide a movable scanner unit in accordance with the present invention, which may be employed to generate the scan lines of FIGS. 4 and 5.

Referring now to FIGS. 1 and 2, illustrated therein are two preferred embodiments of scanning and verifier apparatus 10a and 10b, respectively. Each embodiment is arranged to enable the scanning of a face of a data carrying graphical symbol, with scans occurring (in succession) at a plurality of preferably substantially equi-spaced scan positions along a respective height of the graphical symbol. For convenience, the various embodiments of the invention, such as 10a and 10b, will be collectively designated scanning and verifier apparatus 10. Included with each apparatus illustrated is a chassis, either 14a or 14b, user interface 40, and a movably mounted scanner unit 20. The scanner unit 20 is best represented in FIGS. 3 and 7A. The scanner unit 20 may most preferably be provided by a laser scanning device or element, such as a moving mirror type-scanner. A moving mirror type-scanner device generates a scan line, most preferably using a laser source having a pre-selected spot size generated at a specific wavelength. A typical scan line 28a, which can be seen in FIG. 4, is formed by a sweeping a laser spot across a substrate (possibly back and forth) in a linear fashion. The chassis 14a and 14b, as shown in FIGS. 1 and 2, are to be considered as representative embodiments of possible housings that may be employed. Importantly, as will be discussed in detail when referring to FIGS. 7A, 7B, and 7C, the scanner unit 20 is movably mounted. The movable mounting of the scanner unit 20 enables the scanner unit 20 to be moved to a selected (scanning) position. Accordingly, the movable mounting of the scanner unit 20 enables the controlled movement of the scanner unit, which most preferably would be a stepped and incremental movement, to establish any one of a plurality of selectable scanning positions situated between a first (initial) position and the second (final) position. Importantly, the movable mounting will most preferably enable the scanner unit to move in a plane substantially parallel to a plane established by the face of the graphical symbol, thereby supporting scanning at any selected scanning position long the respective height of a graphical symbol with scanning occurring at a constant scanning distance. It may be noted that maintaining a constant scanning distance is an important consideration for verification and evaluation of graphical data carrying symbols. For example, maintaining a constant scanning distance results in a properly focused and sized laser spot, help maintain calibration of the scanning apparatus, etc.

Figure 7B:
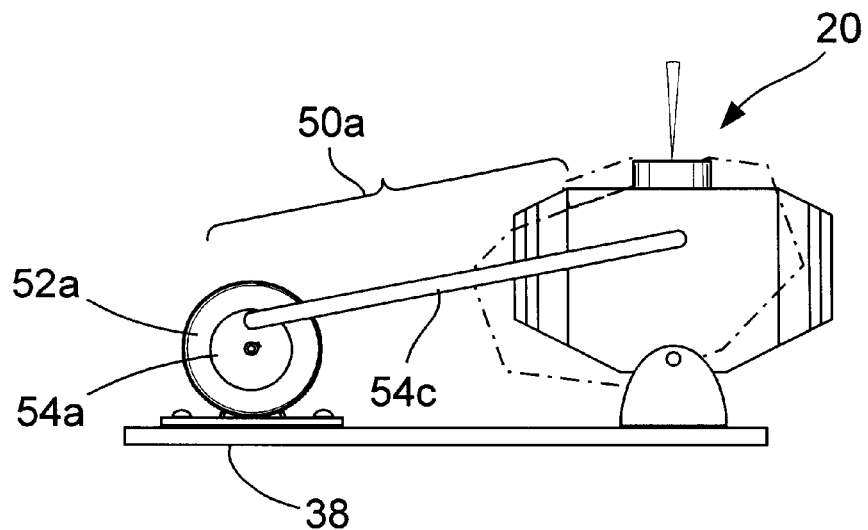
Figure 7C:
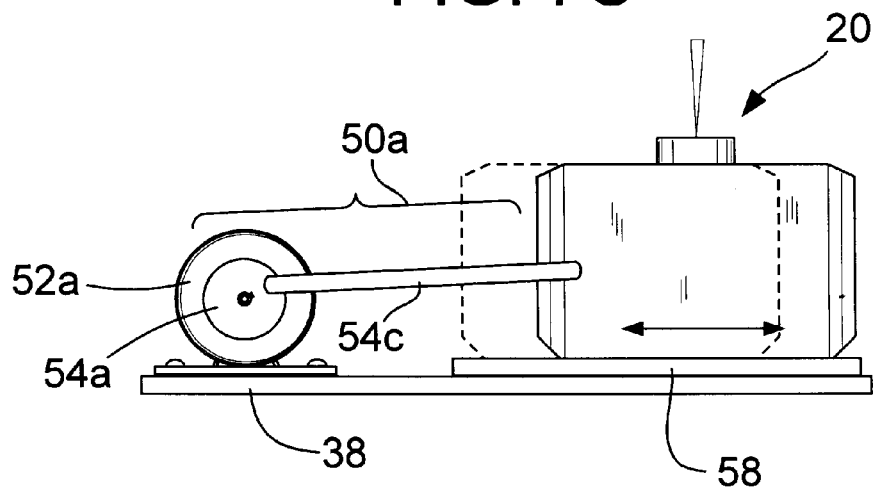

If a movable scanner unit 20, as depicted in FIGS. 7A to 7C, is moved in a controlled manner to a plurality or succession of incrementally differing scanning positions, the face of a data carrying graphical symbol may be scanned so as to produce a plurality of substantially equi-spaced scans lines or scans in a manner consistent with the ANSI requirements. Each equi-spaced scan would most preferably result in generating a scan reflectance profile (SRP) signal. A discussion of scanning patterns, and results and characteristics thereof, in accordance with the present invention, will be addressed further below when referring to FIGS. 4 and 5.

The term 'scanner unit', as applied to scanner unit 20 and equivalents, is to be broadly defined. As such, the movable mounting of the scanner unit 20 may actually involve a movable mounting of only a portion of the scanning unit 20, with other portions not movably mounted. In this latter situation a suitable coupling may be employed to operatively couple the movably mounted scanning portion to the other portions. Therefore, the scanner unit 20 may be composed of several portions, or alternately provided as single unit as depicted in FIGS. 7A, 7B, and 7C.

Returning to FIG. 1, the scanning and verifier apparatus 10a is depicted with a support bed 16a and an elevated or over-head scanning arrangement. The support bed 16a is structured to support a graphical symbol, such as graphical symbol 26a, in a face up orientation. Once placed (and positioned) upon the support bed 16a, the scanning of graphical symbol by an elevated scanner unit 20 occurs. As shown, a scanning and verifier system 10a may be provided with a elevation arm 18 structured to house a movably mounted scanner unit 20, or a scanning portion thereof. Preferably, the elevation arm 18 would locate the scanner unit 20 proximate to a first end 18a of the elevation arm. Alternately, particularly if mirrors, lenses, and or other known optical conduction or reflection means are employed, the scanner unit 20 may be located in a position not supporting 'direct' or line-of-sight scanning. As further shown in FIG. 1, a transparent plate 22a may be placed upon the support bed 16a, and over a substrate having graphical symbol 26a disposed thereon. The graphical symbol 26a is placed face up upon the support bed 16a and scanned by (elevated) scanner unit 20, most preferably at a plurality of substantially equi-spaced scan positions along a respective height of the graphical symbol 26a. As such, a plurality or succession of substantially equi-spaced parallel scans are generated by repeatedly positioning the scanner unit 20 and taking a scan of the symbol. This process continues until some number of spaced parallel scans are taken across differing portions of a face of the graphical symbol. It may be noted that the structure and organization of the scanning and verifier apparatus 10a of FIG. 1 causes scanning to be in a downward direction, and angled with the scanner unit 20 situated above the scanned symbol. Known scanning arrangements, such as 'flat bed scanners' used with desktop and personal computers, which are controlled via a software program and a communication link from the computer, generally do not permit 'downward' scanning, and certainly not in full ambient lighting. In addition, these devices do not satisfy the spot size and other requirements discussed herein, and are structured to provide for the capture of high resolution graphical information contained in scanned image and or textual content. As such, common desktop scanners typically generate a large bit map image file that is stored for later use. In contrast, the present scanning apparatus is intended to scan, at a plurality of locations, and most preferably generate an SRP signal for each scan taken. Importantly, when evaluating and verifying graphical symbols, such as 1D and 2D bar code indicia, linear laser scanning devices are greatly preferred to other available arrangements (e.g., a linear array of CCD devices). Laser scanner devices meet and or satisfy important characteristics, such as laser spot size, speed of the laser sweep (across the symbol), the wavelength of the laser source, etc. Further, these characteristics or specifications may be selected to match the characteristics of the scanning devices that will ultimately be employed to later read and decode the symbol, say at a point-of-sale terminal in a retail store.

Another preferred embodiment of the present invention is depicted in FIG. 2. A scanning and verifier system 10b is shown with preferably portable chassis 14b having a scanner unit 20, along with other needed components and modules mounted within an interior space of the chassis 14b, or an equivalent housing. A transparent plate 22b is provided, possibly mounted and or fixed within a support bed 16b, to hold a graphical symbol to be scanned in a suitable position, with a face-down orientation. Accordingly, scanning of a graphical symbol, such as the graphical symbol 26a, will require scanning through the transparent plate 22b via the scanner unit 20, which is situated below the symbol within the chassis 14b. As such, scanning may be said to be in an 'upward' direction, versus the embodiment 10a, wherein scanning may be said to be in a downward direction. If a cover 28 is included, it may be fixed to a suitable housing, such as the chassis 14b, by a hinge means 58. As illustrated, the cover 28 may be lifted to enable an individual to place a portion of a substrate (having a graphical symbol to be scanned) face down upon the transparent plate 22b. The cover may subsequently be placed in a lowered position (not explicitly shown), with the graphical symbol to be scanned sandwiched between the transparent plate 22b and the cover 28. As skilled persons will appreciate, the chassis 14a and 14b employed in FIGS. 1 and 2, respectively, are one of a number of configurations of chassis or more generally housings, that may be provided. For example, arrangements are certainly possible that provide for scanning (and possibly verification) of a respective graphical symbol with the symbol supported and maintained with a vertical orientation, if desired or convenient. In addition, the use of mirrors, lenses, and or other known optical conduction or reflection means would enable a variety of other structural configurations to be proposed and embodied. Importantly, it must be understood that regardless of the specific architecture employed to embody the present invention, the ability to produce a plurality of substantially parallel scan lines, which are generated at a plurality of preferably equi-spaced positions along at least a portion of a respective height of a face of a data carrying graphical symbol (e.g., as shown in FIGS. 4 and 5), with the distance between the portion of the graphical symbol scanned and the scanner unit 20 substantially maintained at a constant scanning distance, is central to the present invention and all embodiments thereof.

Turning now to FIG. 3, a high level block diagram of an embodiment of the invention is provided. The scanner unit 20 is configured with a suitable support means 30. Support means 30 may be provided by any structure that enables the scanner unit 20 to be moved, as needed, between a first or initial scanning position and a second or final scanning position. As such, support means 30 may be provided by a variety of suitable mounting arrangements, possibly including slidable, pivotal, hinged, racked, and other mounting arrangements enabling the scanner unit 20 to be positioned in any desired position between the first position and the second position. Also shown in FIG. 3 is a drive unit 50, which is suitably mounted and operatively coupled to the scanner unit 20. The drive unit 50 is arranged to be responsive to a control module 60 to position the scanner unit 20 in a desired scanning position (between the first and second positions, inclusively). Accordingly, the control module 60 may be employed to control the drive unit 50 for moving the scanner unit 20 in a controlled manner to enable a plurality of scans to be taken, in succession. Thus, the control module 60 establishes a current (scanning) position, via the drive unit, and a scan is taken. Next, the control module 60 may be employed to move the scanner unit 20 to a next (incremental) position, and cause a next respective scan to be taken. The process may continue until a plurality of scans have been taken, with each possibly processed as required.

It should be noted that the control unit 60 may preferably be provided in the form of an embedded system including a processor 62, a memory unit 64 (having suitable firmware stored in non-volatile memory), and any required interface circuitry 66. However, the present invention may alternately be implemented by hardware based embodiments, such as digital logic systems realized by programmable logic devices (PLDs) and or field programmable gate arrays (FPGAs). Yet other possible embodiments, or implementation variations, are certainly possible. For example, mixed signal application specific integrated circuits (ASICs) may be employed including standard or DSP-like microcontroller or microprocessor 'cores'. Indeed, skilled persons will understand the variety of alternate implementations are possible. Therefore, it is important to understand that the present invention is to include all such embodiments, implemented with any suitable technology and structure, that enables a plurality of substantially equi-spaced scans to be taken along at least a portion of a respective height of a face of a data carrying graphical symbol (typically disposed on a substrate). It must also be noted that embodiments are contemplated with a minimal architecture, wherein the control functions of the control module 60 may be provided by a common personal computer, or an equivalent, having a suitable interface enabling the operative coupling of the computer to the scanning apparatus of the invention. For example, such an operative coupling may be established via a standard parallel or serial port, or another added port/interface card.

As indicated in FIG. 3, and as also clearly shown in FIGS. 1 and 2, a user interface 40 may be provided to enable information to be exchanged with a user or operator of the scanning and verifier apparatus 10. Preferably the user interface 40 may be structured to include a display 42, a switch means 44, and an audio module 46. The switch means 44 may be provided by a simple keypad or a plurality of switches that are user operated or activated. The display 42 would most preferably be provided by an LCD display module, possible having a graphical output capability. The audio module 46 would include an audio sounder 48 to provide contemplated audio prompts, feedback tones, error indications, alert signals, etc. The above listed user interface components (i.e., the display 42, the switch means 44, etc.), as well as others that may be employed, will be generally known to skilled persons. The use and functional capabilities of the user interface may include initializing and calibrating the scanning and verifier apparatus 10, establishing how many scans to take, the spacing to be provided between scans, as well as other functions that will become apparent after a careful review of this disclosure.

Turning now to FIGS. 4 and 5, a possible pattern of scan lines are shown across or upon a graphical symbol 26a/26b. Specifically, FIG. 4 provides a plan view depicting a plurality of preferably equi-spaced scanning positions, having spatial integrity, taken along the height of a graphical symbol 26a, which as shown represents a 1-dimensional bar code indicia. The plurality of parallel scan lines or scans of FIG. 4 are shown taken along a respective height of the graphical symbol 26a, with each scan line across (preferably somewhat or nearly orthogonal or perpendicular to) the elements composing the graphical symbol 26a. Similarly, FIG. 5 provides a plan view of a 2-dimensional graphical symbol 26b (e.g., a PDF417 2-D bar code indicia), scanned in a fashion similar to that of the symbol depicted in FIG. 4.

As shown in FIGS. 4 and 5, a first (current) scanning position 28a may indicate a starting point for scanning, or alternately, a first scan of interest. This scanning position is assumed to be at or below a first position at which the scanner unit 20 may be placed. It may be noted that this first or initial position may be selectable, for example, by a user via the user interface 40, or by a series of test scans conducted by the control module 60. A next scanning position 28b may be assumed to indicate the next position at which a scan will be taken. As a result, and as illustrated, a plurality of scans may be taken having a spatial integrity established by providing for a plurality of substantially equi-spaced (e.g., stepped) scanning positions, wherein scans or scan lines are taken having a known relative position to each other. Skilled persons will understand that the established spatial integrity of the plurality of scans may be important whether the scanned graphical symbol is a simple 1-D bar code or a matrix-type 2-D bar code. Also, it may also be noted that the number of scans indicated in FIGS. 4 and 5 are illustrative only. For example, when scanning graphical symbol 26b of FIG. 5, it may be desirable to provide scans (or equivalently, scan lines) that are significantly closer together, essentially enabling an 'image' of the graphical symbol to be collected and stored. Further, although the scan lines shown or implied in FIGS. 4 and 5, are illustrated as being somewhat orthogonal or perpendicular to elements composing the graphical symbols 26a/26b, this need not necessarily be the case. It is certainly possible to scan at a more random or oblique angle, and provide software to process the collected scan related information to enable a quantitative evaluation of the quality parameters associated with the scanned graphical symbol.

A preferred method of operation for the present invention will now be presented while referring to the flowchart of FIG. 6. As shown, the process may commence at 100 by locating the scanner unit 20 at a first or initial position selected to enable scanning at a first scanning position. This position, which may be established by a user using the user interface 40 or automatically determined by the control module 60, may actually enable a first scan to be taken slightly above (or below) the graphical symbol to be scanned. Alternately, the first scan position may be proximate to a first side or boundary of the graphical symbol. As such the 'first position' may represent a physical extreme for linear motion of the scanner unit 20, or a 'learned' extreme. An exemplary first scanning position may be scanning position 28a (shown in FIG. 4).

Next, at 104 the graphical symbol is scanned. This may result in a plurality of data sample points being generated and stored in a suitable memory, such as memory unit 64 of FIG. 3, and subsequently processed as required. Alternately, the scanning may simply provide SRP signals to other devices or units, which are responsible for processing the SRP signals. As such, a separate step (not shown) may be interposed between steps 104 and 106 to specifically account for the collecting of sample values (via the digitizing of the SRP signal) and possibly the processing of the sample values. At step 106, the scanner unit 20 is moved to a next scanning position, most preferably in an incremental controlled manner. For example, a stepper motor may cause the position of the scanner unit 20 to be incrementally changed so that a next scan is taken at a known delta from the first or most recently taken scan—thus providing for the desired spatial integrity between scans.

At 108 a check may be made to ascertain if a predetermined or desired number of scans have not been taken. If more scans are required, activity continues at 104, with the taking of another scan. The 'loop' of 104, 106, and 108, continues until it is determined at 108 that a proper or sufficient number of spaced scans to be taken, have been taken. At which time the scanning activities in accordance with the present invention may cease.

At step 110, additional processing may be provided, if required by the specific method being conducted. For example, such processing may include the processing of stored data samples to determine the relative quality of the scanned graphical symbol. Alternately, this supplemental processing may entail combining previously processed results, as discussed above, to provide an overall quantitative evaluation (say based on a plurality of scans taken of the symbol). Accordingly, most preferably each scan would result in the generation of a scan reflectance profile (SRP) signal, which would be digitized and stored, say during step 104. A subsequent analysis of stored, digitized data samples may be conducted to determine the quality or ANSI level grading of the scanned graphical symbol.

It should be noted that the method of FIG. 6 is but one example of a number of possible methods that may be employed with various embodiments of the scanning apparatus and scanning and verifier systems disclosed or implied herein. All variations employing the fundamental aspects of the invention are considered within the scope of the present invention. Further, it should be understood that scanning methods taught by U.S. Pat. No. 5,729,001 to Spitz may certainly be employed, at least in part, with the present invention to learn the location and size of the symbol. Accordingly, the actual number of scans taken may vary with the specific graphical symbol that is being scanned and the relative size of such a symbol.

Referring now to FIGS. 7A, 7B, and 7C, there are illustrated arrangements for movably mounting scanner units 20 in accordance with the present invention. As shown in FIG. 7A, a scanner unit 20 may be slidably mounted using a slide mount 32, which may be fixed to a base 38. A variety of slide mounts 32 may be provided by skilled persons. It may be assumed that the scanner unit 20 of FIG. 7A is shown in a first position in solid lines, with dotted lines showing a second position that the scanner unit may be moved to. Therefore, a drive unit 50 may be embodied having a motor 52 (possibly including a transmission and or gearing) and a drive member 54b (shown as a threaded strut). As the motor 50 is activated the partially treaded drive member 54b may be employed to move the scanner unit 20 in a controlled manner to a desired or next scanning position, while importantly maintaining the scanner unit 20 at a constant scanning distance from the graphical symbol 26a/26b. The desired scanning position is established by moving the scanner unit 20 to a selected position (or location) between the first and second positions (inclusively). As such, the structure of FIG. 7A enables a plurality or succession of preferably equi-spaced scans to be taken at a plurality of respective scanning positions along at least a portion of the height of a suitably positioned graphical symbol. Clearly, the order of the scan locations may be provided most efficiently as a linear series of stepped locations, one after the other. However, a more random or non-linear ordering of scan positions may be desirable. The present invention is certainly capable of providing a selected plurality of desired, more random scan positions, with the spatial integrity of the scans still being determinable as the relative positions of each respective scan is known at the time each scan is taken.

It must be understand that a plurality of scanning positions may be established by a number of other physical scanning arrangements. For example, as shown in FIGS. 7B and 7C, a drive unit 50a may be structured with a motor 52a, a cam disk 54a fixed to a rotatable shaft of the motor 52a, and a drive member 54c. The drive member 54c is structured and arranged to enable a small angular rotation of the cam disk 54a to result in moving the scanner unit 20 to a next respective scanning position. As can be seen in FIG. 7B, the scanner unit 20 may be pivotally mounted, enabling controlled a motion of the scanner unit to select a scanning position, while substantially maintaining a nearly constant scanning distance between the scanner unit 20 and the graphical symbol being scanned. Alternately, any other suitable mounting arrangement, including a slidable mounting arrangement as depicted in FIG. 7C, may be employed to realize a scanning arrangement enabling a plurality of scans to be taken, each at a differing scanning position.

While there have been described a plurality of the currently preferred embodiments of the present invention, along with varied methods of operation, those skilled in the art will recognize that other and further modifications may be made without departing from the present invention. In addition, yet other arrangements may be provided that simulate the controlled (e.g., stepped) motion of a scanner unit 20. For example, a correctly positioned mirror, having a suitable mounting structure to enable the tilting or rocking of the mirror, would enable a skilled person to generate a plurality of scan lines as shown in FIGS. 4 and 5, without 'physically' moving a scanner unit 20. This arrangement may be preferable for a number of reasons, including cost, reliability, ease of construction, weight, as well as others apparent to skilled persons. However, these arrangements may cause a change in the scan distance or the length of the optical path as the scanner unit is moved from the first to the second position. Accordingly, it may be noted that the most preferred embodiments of the present invention may provide for a constant scan distance (i.e., nearly constant optical path distance) to be maintained between the scanning unit 20 and the scanned portion of the graphical symbol as scans are taken. However, it should be understood that all embodiments of the invention enabling a plurality of preferably equi-spaced and suitable scans to be taken at a plurality of respective scanning positions along at least a portion of the height of the graphical symbol are to be considered within the scope and spirit of the present invention.

What is claimed is:

1. A scanning and verifying apparatus enabling scanning of a face of a data carrying graphical symbol at a plurality of spaced scanning positions along a respective height of the graphical symbol, the apparatus comprising:
   (a) a linear laser scanner unit movably mounted to enable a spaced scanning of a face of a data carrying graphical symbol at any one of a plurality of selectable scanning positions establishable between a first position and a second position;
   (b) a control module located within a housing of the scanning and verifier apparatus; and
   (c) a drive unit that is responsive to the control module and structured for moving the laser scanner unit in a controlled manner to a selected scanning position to produce at least one scan reflectance profile signal associated with scanning at the selected scanning position;
   (d) the scanning and verifier apparatus structured to maintain the laser scanner unit at a desired substantially constant distance from a support surface to enable a desired non-contact laser scanning of the face of the graphical symbol, even in the presence of available ambient lighting, with the desired distance substantially maintained for each respective scan position established and each scan reflectance profile signal generated and collected;
   (e) wherein the collected scan reflectance profile signals are available for analysis by the control module for evaluating a print quality of the scanned graphical symbol.

2. The scanning and verifying apparatus according to claim 1, wherein a plurality of collected scan reflectance profile signals are processed and analyzed by the control module to determine a print quality evaluation result that is presented to an operator.

3. The scanning and verifier apparatus according to claim 1, further including a housing having an elevation arm, with the movably mounted laser scanner unit supported by the elevation arm so that the scanner unit is suspended over the graphical symbol at a selected scanning distance therefrom, thereby simulating a scanning arrangement generally employed when scanning and reading a data carrying graphical symbol for decoding purposes at an end-location.

4. The scanning and verifying apparatus according to claim 1, wherein the laser scanner unit is one of:
   (a) slidably mounted to enable the scanner unit to move in a plane substantially parallel to a plane established by the face of a graphical symbol supported upon the support surface, thereby enabling scanning at any selected scanning position long the respective height of the graphical symbol, with scanning occurring at a constant scanning distance; or
   (b) pivotally mounted to enable the scanner unit to be pivoted to support scanning at any selected scanning position long a respective height of the graphical symbol, with scanning occurring at a substantially constant scanning distance.

5. A method for producing a plurality of spaced scans taken along a height of a data carrying graphical symbol, with each spaced scan causing a scan reflectance profile signal to be generated, collected and analyzed for evaluating print quality of the scanned graphical symbol, the method comprising the steps of:

(a) locating a non-contact laser scanner unit in a first scanning position, the first scanning position selected to enable a laser scanning of the data carrying graphical symbol at the first scanning position, as well as any of a plurality of subsequent spaced scanning positions along at least a portion of the height of the graphical symbol;

(b) scanning with the laser scanner unit at the selected scanning position, generating an associated scan reflectance profile signal;

(c) sensing and digitizing the scan reflectance profile signal, causing a storing of a plurality of data sample values;

(d) moving the laser scanner unit to a next spaced scanning position, the moving of the laser scanner unit establishing a new scanning position at which a next spaced scan will be taken; and (e) repeating steps (b), (c), and (d) a plurality of times, thereby generating a succession of spaced scans, each scan having an associated scan reflectance profile signal that is digitized and stored; and (f) processing each digitized scan reflectance profile signal, the processing enabling print quality of the scanned graphical symbol to be evaluated.

6. The method according to claim 5, wherein a plurality of equi-spaced scan lines are made across data carrying elements of the graphical symbol, with a spatial integrity of the scans lines preserved.

7. The method according to claim 5, wherein a user interface is provided for communicating a print quality evaluation result to an operator.

8. The method according to claim 7, wherein evaluation and quality information provided to an operator indicates a combined, overall quantitative quality evaluation based on a plurality of the scan reflectance profile signals generated by scanning the data carrying graphical symbol at a plurality of different scanning positions.

* * * * *